Aug. 12, 1952 A. E. SNEDEGER 2,606,677
VEHICLE BODY HAVING UNLOADING MEANS
Filed Oct. 24, 1949 2 SHEETS—SHEET 1

INVENTOR.
Albert E. Snedeger
BY
ATTORNEY.

Aug. 12, 1952 A. E. SNEDEGER 2,606,677
VEHICLE BODY HAVING UNLOADING MEANS
Filed Oct. 24, 1949 2 SHEETS—SHEET 2
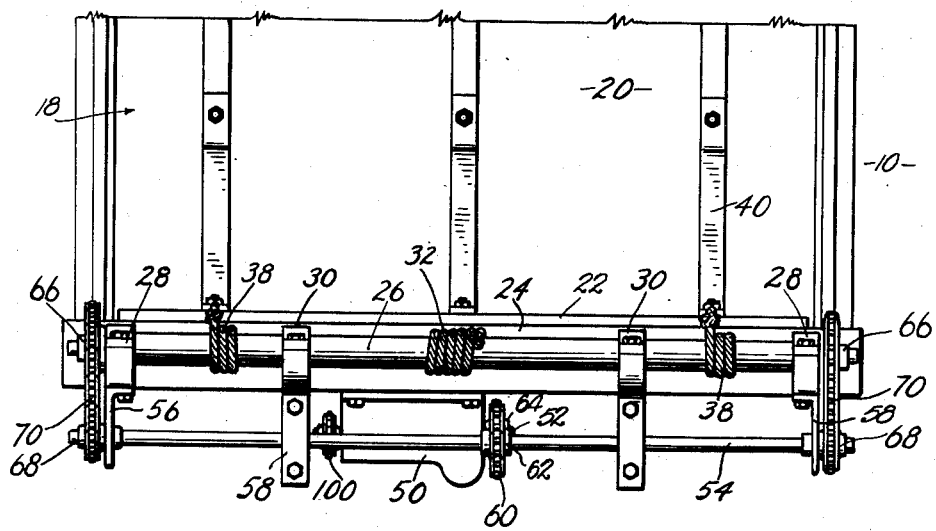
Fig. 3.
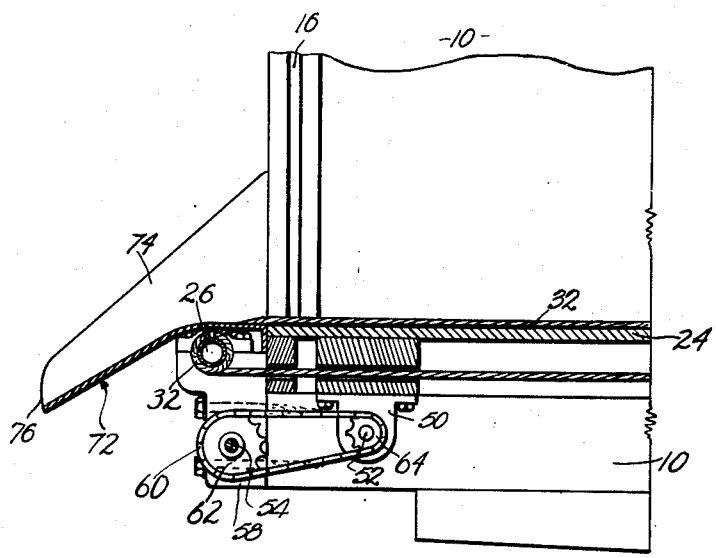
Fig. 4.
INVENTOR.
Albert E. Snedeger
BY
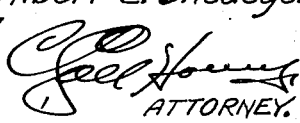
ATTORNEY.

Patented Aug. 12, 1952

2,606,677

UNITED STATES PATENT OFFICE 2,606,677

VEHICLE BODY HAVING UNLOADING MEANS

Albert E. Snedeger, Independence, Mo., assignor of one-half to J. Claude Wilson, Independence, Mo.

Application October 24, 1949, Serial No. 123,210

1 Claim. (Cl. 214—83.22)

This invention relates to structure adapted for use with a conventional truck of the kind having an engine and a material-receiving body, the primary object being to provide a follower panel or gate reciprocably mounted within the truck body to move material therewithin toward one end of the body, thereby eliminating the necessity of the laborious manual task of scooping or otherwise unloading such material.

Another important object of the present invention is to provide a conveyor or elevator for receiving the material as the same emanates from the open end of the truck body, said conveyor and the above mentioned follower being operably connected through common mechanism with the truck engine by means of a train of gears, shafts and endless belts or chains.

Another important object of the present invention is to provide a combination material shifting and elevating assembly wherein material within a truck body is moved toward one open end thereof while such material is simultaneously received by a conveyor or elevator and thereupon removed remote from the truck body.

A further object of the present invention resides in novel details of construction and mechanism rendering the follower and the conveyor simultaneously operable by common mechanism connected with the truck engine.

Other objects relate to details of construction, all of which will be made clear or become apparent as the following specification progresses taken in connection with the accompanying drawings, wherein:

Fig. 3 is a fragmentary, end elevational view on an enlarged scale with the truck bed hopper and the conveying means entirely removed; and Fig. 4 is an enlarged, transverse, fragmentary, detailed, cross-sectional view taken on line IV—IV of Fig. 1 with the conveyor removed.

Figure 1:
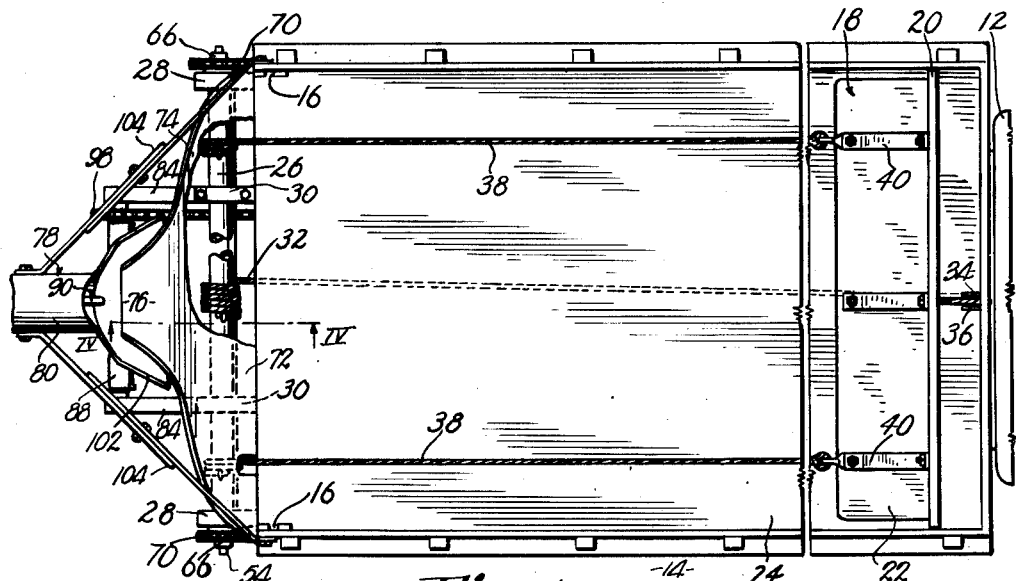
Fig. 1 is a fragmentary top plan view of a vehicle body having unloading means made in accordance with the present invention.
Figure 2:
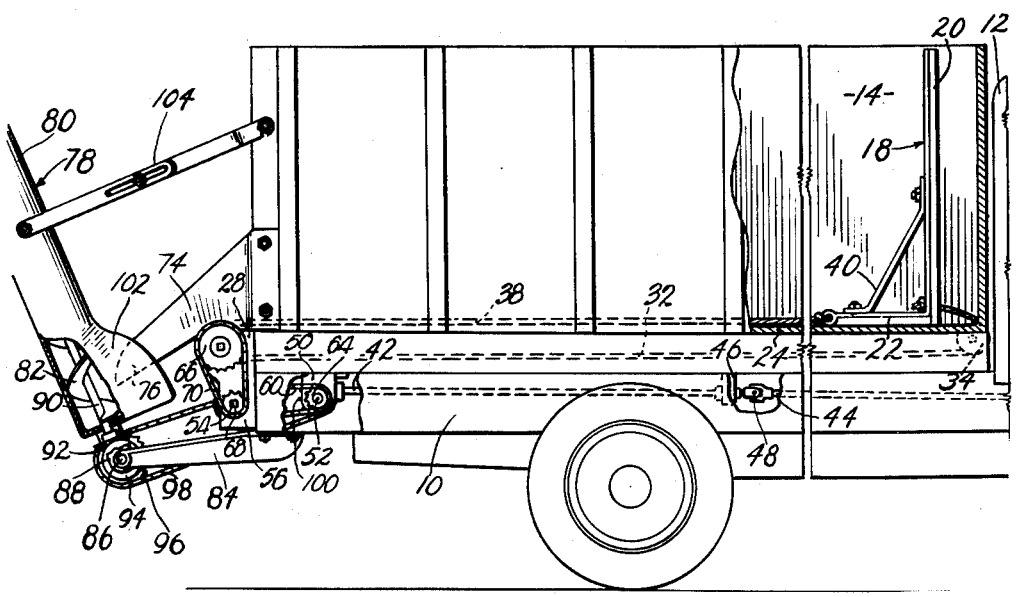
Fig. 2 is a fragmentary, side elevational view thereof, parts being broken away and in section to reveal details of construction.

It is common knowledge that various means have heretofore been provided for unloading trucks, wagons and the like of the materials contained within the body thereof, the most conventional type being that of swingably mounting the body itself for tipping movement. Similarly, conveyors or elevators have been provided either affixed to or removably attached to the truck body for moving the unloaded materials to a remote point. However, it is oftentimes not desirable to pivotally mount the truck bed and body and when such body is relatively large, unloading of materials therefrom is a time-consuming and laborious task.

This invention therefore, brings into combination a follower means for pushing material along the truck bed toward the rearmost open end thereof, and a conveyor or elevator for receiving the material, all operated commonly through the truck engine.

A conventional truck is shown fragmentarily in the drawings including frame 10 upon which a cab 12 and a body, broadly designated by the numeral 14, together with an engine (not shown), are mounted. Body 14 is conventionally provided with a removable end gate (not shown) for holding material within body 14 when such end gate is positioned in tracks 16.

A follower 18 is L-shaped in cross-section and includes an upstanding panel 20 and a horizontal plate 22, slidable upon bed 24 of body 14 when follower 18 is reciprocated. The upstanding panel 20 is preferably co-extensive in length with the distance between the side walls of the body 14 and substantially the same height as such side walls.

A windlass is provided for reciprocating the follower 18 along a rectilinear path extending longitudinally of the body 14, said windlass including an elongated rotatable drum 26. Drum 26 rotates upon a substantially horizontal axis and extends transversely across the body 14 immediately below the bed 24 thereof.

A pair of spaced apart bearings 28 and a pair of intermediate bearings 30, all mounted upon the frame 10 of the truck, rotatably support the drum 26. A rope or cable 32 having one end thereof affixed to the drum 26 and coiled thereabout, extends beneath the bed 24 as most clearly illustrated in Fig. 4 of the drawing, toward the forwardmost end of the body 14.

Rope 32 is trained over a pulley 34 adjacent the forwardmost end of the body 14 that is partially positioned within a slot 36 in the body 14 and that end of the rope 32 opposite to the drum 26 is affixed to the follower 18 in any suitable manner. Similarly, a pair of ropes or cables 38, one on each side of the rope 32, each have one end thereof joined to the drum 26 and coiled thereabout. The two ropes 38 extend from the drum 26 in overlying relationship to the bed 24 and join with brackets 40 that also serve to interconnect and reinforce the portions 20 and 22 of follower 18. It is clear therefore, that as drum 26 is rotated in one direction, cables 38 will move follower 18 toward the open rearmost end of the body 14 and draw material within body 14 therewith. When the drum 26 is rotated in the opposite direction, rope 32 will wind about the drum 26 and return the follower 18 to the normal position adjacent that end of the body 14 proximal to cab 12.

A drive shaft including a pair of sections 42 and 44 is rotatably mounted beneath the bed 24 of body 14 through one or more bearings 46 depending from portions of the frame 10, said sections 42 and 44 being interconnected by a universal joint 48.

The section 44 of such drive shaft is operably connected with the aforesaid engine of the truck in any suitable conventional manner whereby, through operation of such engine, rotative motion is imparted to the sections 42 and 44.

A gear box 50 also mounted on the framework 10 beneath the bed 24 of body 14 near the rearmost end of the truck, has a substantially horizontal shaft 52 rotatable on an axis substantially parallel with the axis of rotation of drum 26 and substantially perpendicular to the axis of rotation of the drive shaft including sections 42 and 44.

An elongated idler shaft 54 is rotatably mounted on an axis substantially parallel with the axis of rotation of drum 26 and immediately therebelow. The idler shaft 54 is supported by bearing extensions 56 and 58 on bearings 28 and 30 respectively. Rotation is imparted to the idler shaft 54 from the shaft 52 through the medium of a chain 60 trained about sprockets 62 and 64 on shafts 54 and 52 respectively. The drum 26 is provided with a sprocket 66 on each end respectively thereof and idler shaft 54 is likewise provided with sprockets 68 on each end respectively thereof. The corresponding sprockets 66 and 68 are interconnected by endless chains 70.

A shield for protecting the drum 26 and its related underlying parts is designated by the numeral 72, said shield 72 also serving as an outlet spout for the material emanating from the body 14. As shown in Fig. 4, shield 72 extends outwardly and downwardly from the proximal open end of body 14 and Fig. 1 illustrates the manner in which such spout 72 extends entirely across the proximal transverse edge of bed 24.

Shield 72 is provided with opposed sides 74 and a relatively narrow, central spout portion 76. A conveyor or elevator 78 is provided for receiving the material emanating from the spout 76, said elevator 78 including an elongated tube 80 having a rotatable helix 82 therewithin. Conveyor 78 is supported upon the truck through the medium of a pair of rearwardly extending spaced arms 84 rigidly secured to the framework 10. The outermost free ends of the arms 84 mount a rotatable shaft 86 substantially parallel with shafts 52, 54 and drum 26.

A U-shaped bracket 88 having the legs thereof pivotally supported by the shaft 86, extends upwardly therefrom and has its bight in underlying supporting engagement with the proximal end of the tube 80. The bight portion of bracket 88 may be rigidly secured to the tube 80 in any suitable manner such as by welding.

Helix 82 is provided with a shaft 90 that extends through the proximal end wall of tube 80 and through the bight of bracket 88. The outermost free end of shaft 90 has a beveled gear 92 thereon in mesh with a second beveled gear 94 that is in turn secured to the shaft 86. Rotative motion is imparted to the shaft 86 through the medium of a sprocket 96 secured thereto and an endless chain 98 trained about the sprocket 96 and about a sprocket 100 mounted on one end of the shaft 52 opposite to the sprocket 64.

The tube 80 of conveyor 78 has a hopper 102 underlying the proximal ends of the spout 76 for receiving the material and a pair of extensible brackets 104 interconnecting tube 80 and body 14 permits swinging movement of the conveyor 78 as the bracket 88 pivots on shaft 86. Obviously, when the body 14 is loaded with material an end gate is placed within the channels 16 and the follower 18 is positioned adjacent the forwardmost end of the body 14. When it is desired to unload such material, the end gate is removed and the truck engine energized to rotate the shaft sections 42 and 44. Such rotative action in turn rotates the shaft 52, it being understood that any suitable train of gears such as a worm-gear assembly, may be provided in the box 50 for imparting such movement to shaft 52. The sprocket 64 rotates sprocket 62 through chain 60 which in turn rotates the outer idler shaft 54 and the drum 26 through chains 70, sprockets 66 and sprockets 68. When the drum 26 rotates in one direction, follower 18 will be moved toward the open end of the body 14 carrying material therewith. Such movement of follower 18 is accomplished through the cables 38, winding upon the drum 26. Simultaneously, the sprocket 100 on shaft 52 will impart rotative movement to the shaft 86 through chain 98 and sprocket 96. Rotative movement of the shaft 86 causes rotation of the meshing beveled gears 92 and 94 to rotate shaft 90 and the helix 82 within conveyor tube 80. Material emanating from the body 14 will pass outwardly and downwardly with respect to the shield 72 and its spout 76. The material will fall into the hopper 102 of the conveyor 78 and be moved longitudinally of the tube 80 through rotative action of the helix 82.

As soon as all of the material has been thus unloaded from the body 14, the follower 18 is returned from the open end of body 14 toward the closed forwardmost end thereof by reversing the direction of rotative motion in shaft sections 42 and 44. Obviously, the helix 82 will likewise rotate in reverse but inasmuch as all of the material has been entirely unloaded, such idling reverse rotation of the helix 82 will be of no consequence.

It is seen that virtually any type of material that will readily flow from the body 14 into the conveyor 78, may be quickly and easily unloaded through use of the assembly herein provided even though the body 14 is rigidly secured to the frame 10 and not freely swingable to a tipping position as is the usual practice.

The operator may remain in the cab 12 during such unloading operation merely by placing the engine thereof into operation until all of the material has been unloaded. Thereupon by reversing the engine, the follower 18 may be returned to the normal position adjacent the forwardmost end of the body 14 ready for reloading of body 14 and subsequent use of the entire assembly.

Such modifications, particularly in details of construction, may be made as desired without departing from the broad spirit of the invention as evidenced by the scope of the appended claim.

Having thus described the invention, what is claimed as new and desired to be secured by Letters Patent is:

In a truck having a body provided with an open end, a follower reciprocable in the body toward and away from said open end thereof; a pulley at the opposite end of the body; a rotatable drum on the body adjacent said open end thereof; a number of cables coiled about the drum, one of the cables extending below the body over said pulley and being joined to the follower at one side thereof, the remaining cables extending into the body through said open end and being joined to the follower at the opposite side thereof; conveyor means extending upwardly and outwardly from the body and including a rotatable helix secured to the body at the open end thereof; a spout on the body for receiving material from the body as the material is moved through said open end of the body by the follower, and directing the same to said conveyor; an idler shaft carried by the body for rotation in parallelism with the drum; means operably joining the idler shaft and the drum; a drive shaft below the body; means operably connecting said drive shaft with said idler shaft and with said helix respectively; and a protecting shield on the body at said open end thereof in overlying relationship to the drum and to the idler shaft, said spout being formed in the shield.

ALBERT E. SNEDEGER.

REFERENCES CITED

The following references are of record in the file of this patent:

UNITED STATES PATENTS

| Number | Name | Date |
| --- | --- | --- |
| 837,170 | Wishon | Nov. 27, 1906 |
| 1,526,704 | Hird | Feb. 17, 1925 |
| 2,422,268 | Symonds | June 17, 1947 |
| 2,438,301 | Schulte | Mar. 23, 1948 |
| 2,439,541 | Hall | Apr. 13, 1948 |
| 2,490,241 | Smith et al. | Dec. 6, 1949 |
| 2,495,358 | Wengert | Jan. 24, 1950 |
| 2,512,339 | Knapp, Jr. | June 20, 1950 |